No. 857,467. PATENTED JUNE 18, 1907.
W. T. JANNEY & G. H. DERN.
FILTER.
APPLICATION FILED FEB. 21, 1907.
3 SHEETS—SHEET 3.
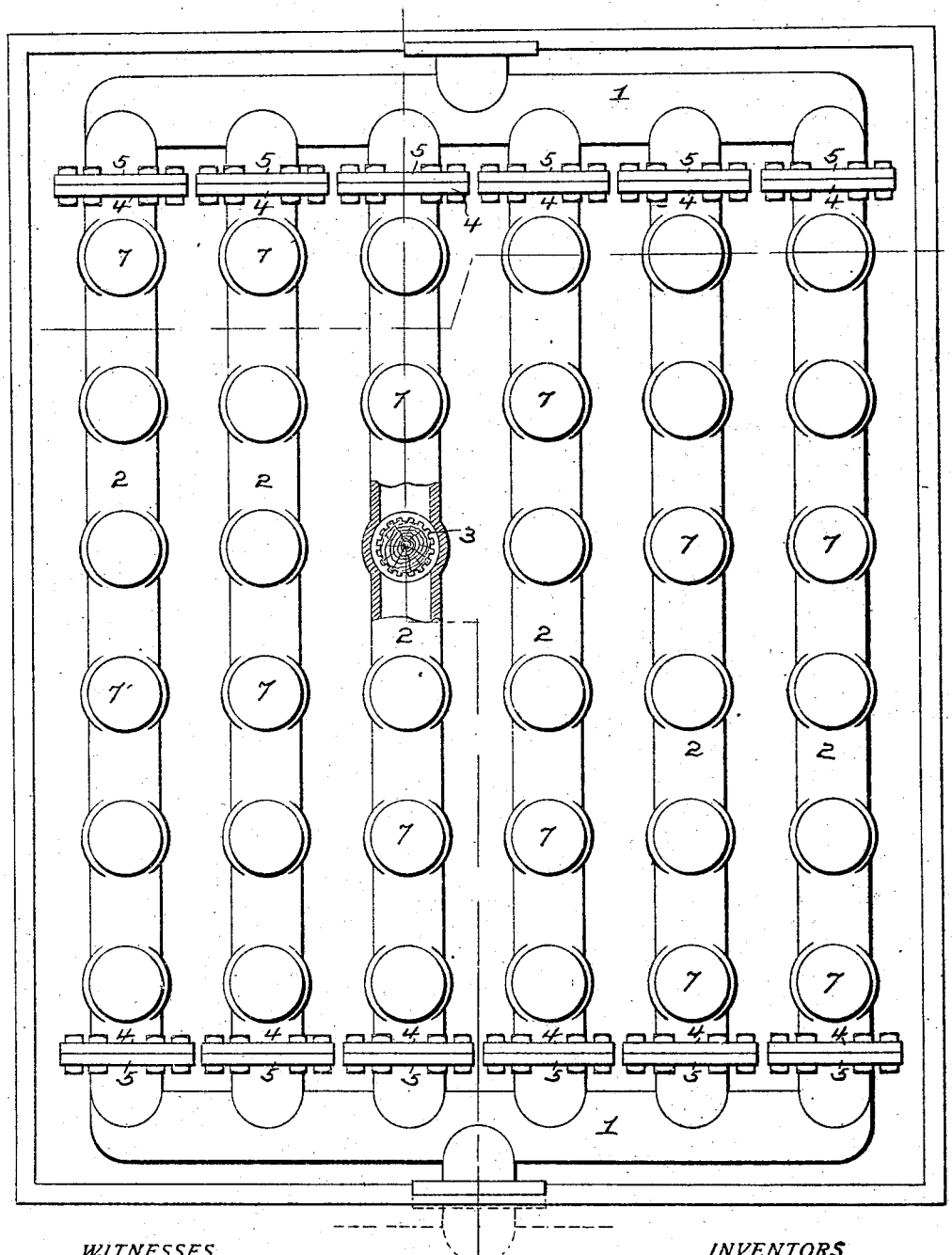

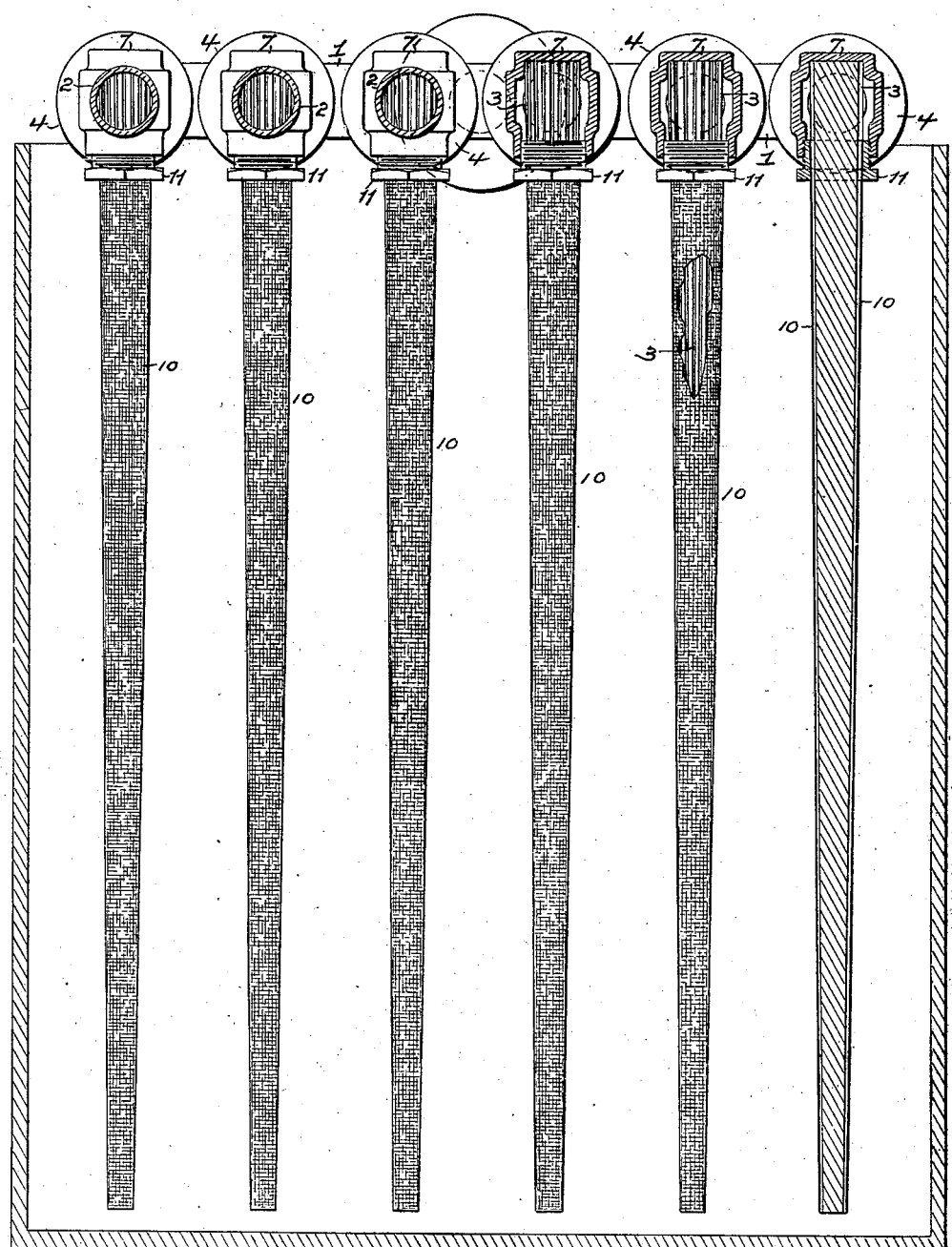

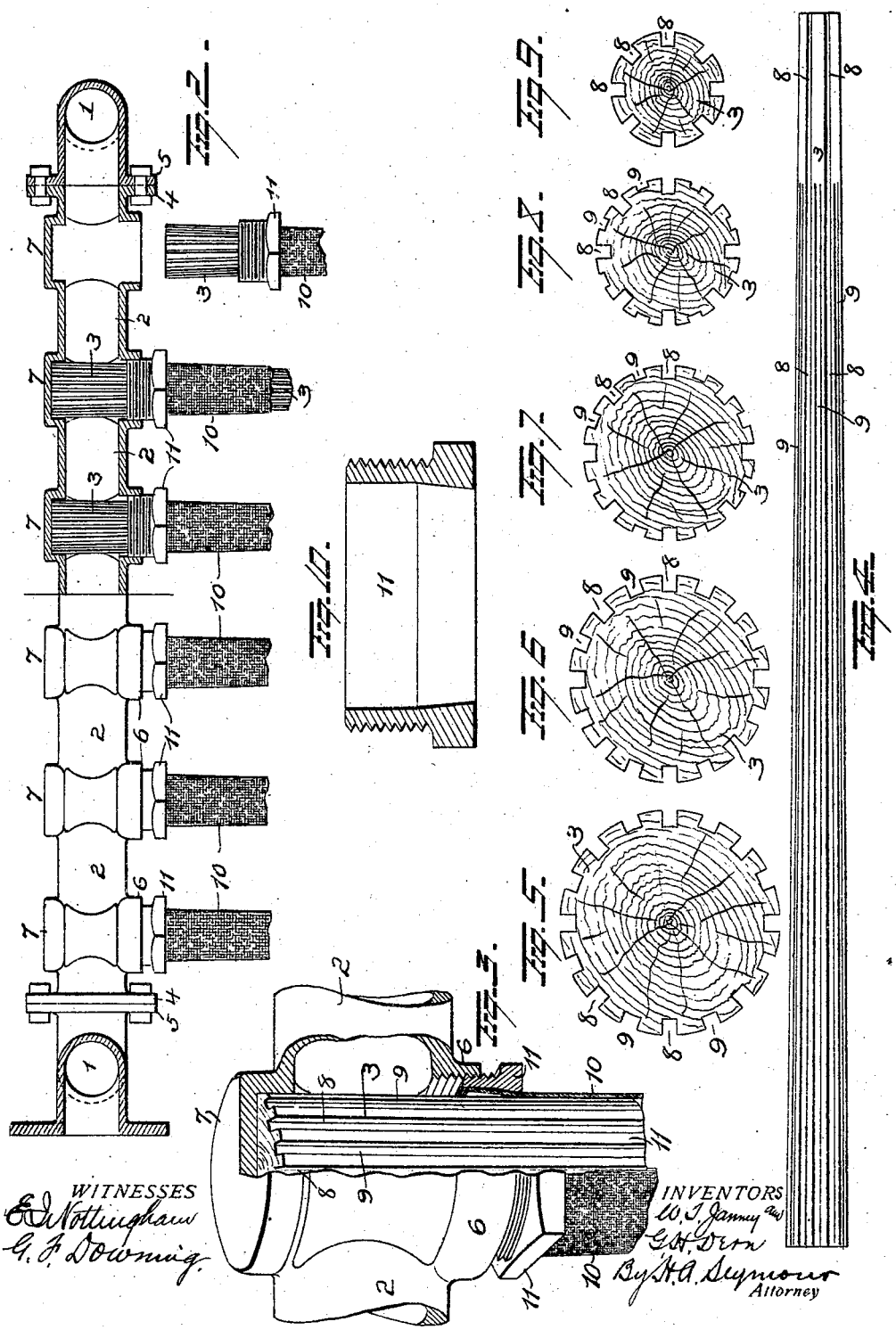

UNITED STATES PATENT OFFICE.

WALTER T. JANNEY AND GEORGE H. DERN, OF MERCUR, UTAH.

FILTER.

No. 857,467.  Specification of Letters Patent.  Patented June 18, 1907.

Application filed February 21, 1907. Serial No. 358,573.

*To all whom it may concern:*

Be it known that we, WALTER T. JANNEY and GEORGE H. DERN, residents of Mercur, in the county of Tooele and State of Utah, have invented certain new and useful Improvements in Filters; and we do hereby declare the following to be a full, clear, and exact description of the invention, such as will enable others skilled in the art to which it appertains to make and use the same.

Our invention relates to improvements in filters, the object of the invention being to provide an improved filter stick and coöperating mechanism facilitating the ready separation of solids and liquids by suction or pressure and the ready removal of the cake forming on the stick without breaking the cake, and the invention consists in certain novel features of construction and combinations and arrangements of parts as will be more fully hereinafter described and pointed out in the claims.

In the accompanying drawings, Figure 1 is a view in longitudinal section illustrating our improvements. Fig. 2 is a view in section at right angles to Fig. 1, Figs. 3, 4, 5, 6, 7, 8, 9, and 10 are views of various details of construction, and Fig. 11 is a plan view, partly in section of the filter.

1, 1, represent tubular binders, connected by tubular cross headers 2, and the latter support improved filtering sticks 3. The cross headers 2 are made with enlarged heads 4 located against similar heads 5 on the binders 1 and secured thereto by bolts passed through alined holes in the heads 4 and 5, suitable packing being provided between the heads to render the joint tight.

The cross headers are provided at intervals with openings to receive filtering sticks 3, and internally screw threaded necks or collars 6 are provided around said openings, and the top wall of the headers, opposite the openings, are made with hollow enlargements 7, to receive the ends of the filtering sticks located in the open necks or collars 6.

The filtering sticks 3 are made preferably of wood of general conical or tapering form and provided with an annular series of longitudinal grooves 8 and 9, the grooves 8 extending throughout the length of the stick and of equal depth throughout, while the grooves 9 located between grooves 8, terminate short of the end of the stick, which is the smaller end, and while at the upper or larger end of the stick they have the same depth as grooves 8, they gradually diminish in depth and merge into the outer surface of the stick near its lower end.

The stick is covered by a sock or bag 10, preferably of canvas or other filtering fabric and secured in the header by a tie bushing 11. The tie bushing 11 is made with an internal conical bore to receive the stick and sock or bag and is externally screw threaded to screw into collar or neck 6 and secure the stick in position, the sock terminating in the tie bushing as clearly shown.

In operation, the filtering sticks are submerged in the material to be filtered, and we will suppose that material to be ore slime, although the filter is adapted for a great many other uses and we do not restrict ourselves to any particular use. Suction is applied to one of the binders and the liquid drawn through the canvas and up the grooves of the sticks into the headers and to a point of delivery. If the receptacle be closed, pressure may be applied to the contents to force the liquid through the canvas and up the grooves of the sticks. In either event, a cake will be formed around the canvas covered sticks which can be displaced from time to time by pressure from the headers down the grooves of the stick and out through the canvas.

By making the sticks of conical or tapering form, the cake is easily dislodged and the stick may of course be made of other shapes and we do not restrict ourselves to any exact shape.

A filter of the construction above described has a great many advantages over filters heretofore known. For instance our improved filter employs a large number of small units which can be readily repaired without interfering with any other unit. The reduced cost of manufacture, there being less wear and tear than is incurred in other filters now in use for a similar purpose. The small amount of dead space contained within the filter which is necessary to fill up with fluid in discharging the filter cake. The readiness with which the cake is discharged owing principally to the shape of the stick, but also largely due to the fact that the cake is discharged without breaking because the entire mass drops off at once.

The cakes may be disposed of in various ways and a great many changes might be made in the general form and arrangement of the parts described without departing from our invention, and hence, we do not restrict ourselves to the precise details set forth but consider ourselves at liberty to make such slight changes and alterations as fairly fall within the spirit and scope of our invention.

Having fully described our invention, what we claim as new and desire to secure by Letters-Patent is:—

1. A filter, comprising a grooved tapering body and a covering of filtering material thereon.

2. A filter, comprising a grooved conical stick, and a fabric sock or bag thereon.

3. A filter, comprising a tapering stick having an annular series of longitudinal grooves, some of said grooves terminating short of the smaller end of the stick and decreasing in depth from the larger end of the stick, and a canvas sock or bag on said stick.

4. In a filter, the combination with a tubular header, of a series of grooved filtering sticks secured in openings in the header, and fabric coverings on said sticks.

5. In a filter, the combination with a tubular header having openings in one wall and hollow enlargements in a wall opposite the openings, of tapering grooved filtering sticks located in the openings and projected up into the hollow enlargements, tie bushings around the sticks and screwed into the openings in the header, and a fabric sock or bag around each stick and secured at its upper end in the tie bushing.

6. In a filter, the combination with two parallel binders of a series of tubular headers connecting the binders, and a series of filtering sticks depending from each header.

7. A filter, comprising a filtering stick of general conical or tapering form having peripheral or surface grooves, and a covering on said stick.

In testimony whereof, we have signed this specification in the presence of two subscribing witnesses.

WALTER T. JANNEY.
GEORGE H. DERN.

Witnesses:
JAMES QUIRK,
JOHN BRANDT.